US012233638B2

(12) United States Patent
Humenick et al.

(10) Patent No.: US 12,233,638 B2
(45) Date of Patent: Feb. 25, 2025

(54) SYSTEMS AND METHODS FOR AN IN-LINE TEXTURE APPARATUS

(71) Applicant: SEKISUI KYDEX, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 122 days.

(21) Appl. No.: 17/972,347

(22) Filed: Oct. 24, 2022

(65) Prior Publication Data

US 2023/0128103 A1 Apr. 27, 2023

Related U.S. Application Data

(60) Provisional application No. 63/272,105, filed on Oct. 26, 2021.

(51) Int. Cl.

| | |
|---|---|
| ***B41F 16/00*** | (2006.01) |
| ***B41F 33/00*** | (2006.01) |
| ***B41M 5/382*** | (2006.01) |

(52) U.S. Cl.

CPC .......... *B41F 16/0006* (2013.01); *B41F 33/00* (2013.01); *B41M 5/382* (2013.01); *B41M 2205/02* (2013.01)

(58) Field of Classification Search

CPC .. B41M 5/0064; B41M 5/0353; B41M 5/035; B41M 5/0358; B41M 5/382; B41M 2205/02; B41F 33/00; B41F 16/0006; B44C 1/24; B44C 1/1712

See application file for complete search history.

(56) References Cited

U.S. PATENT DOCUMENTS

| | | | |
|---|---|---|---|
| 4,242,092 | A | 12/1980 | Glover et al. |
| 5,644,351 | A | 7/1997 | Matsumoto et al. |
| 5,856,267 | A | 1/1999 | Sherman et al. |

(Continued)

FOREIGN PATENT DOCUMENTS

| | | |
|---|---|---|
| JP | 6890643 B2 | 6/2021 |
| WO | WO-2020/162958 A1 | 8/2020 |

OTHER PUBLICATIONS

International Search Report and Written Opinion on PCT Application PCT/US2022/046817 dated Jan. 11, 2023 (9 pages).

(Continued)

*Primary Examiner* — David H Banh

(74) *Attorney, Agent, or Firm* — Foley & Lardner LLP

(57) ABSTRACT

An illustrative dye sublimation apparatus may include a texture sheet with a pattern to be applied to a substrate. More specifically, the texture sheet is pressed into the substrate during the dye sublimation process in order to apply the pattern from the texture sheet while the substrate is heated and simultaneously being infused with an image from a printed sheet. The pressure applied to the texture sheet can vary, for example based on the temperature. Compared to the conventional systems in which substrates are pre-textured, the embodiments disclosed herein describe a process for simultaneous image-infusion and texture-application, which results in a substrate that is both infused and textured.

20 Claims, 8 Drawing Sheets

300

(56) References Cited

U.S. PATENT DOCUMENTS

| | | | | |
|---|---|---|---|---|
| 6,228,805 | B1 | 5/2001 | Ohshima et al. | |
| 7,077,926 | B2 | 7/2006 | Goffi et al. | |
| 7,563,341 | B2 | 7/2009 | Ferguson et al. | |
| 7,870,824 | B2 | 1/2011 | Helma et al. | |
| 9,962,979 | B2 | 5/2018 | Will et al. | |
| 10,583,686 | B1 | 3/2020 | Moalli | |
| 10,940,715 | B2 | 3/2021 | Moalli | |
| 11,065,909 | B2 | 7/2021 | Moalli | |
| 11,919,328 | B2 * | 3/2024 | Moalli | B41M 5/0358 |
| 2002/0148054 | A1 * | 10/2002 | Drake | B44C 1/1712 8/509 |
| 2005/0248649 | A1 | 11/2005 | Farrell et al. | |
| 2007/0163057 | A1 * | 7/2007 | Bertele | B41F 16/02 8/471 |
| 2011/0229664 | A1 | 9/2011 | Hoggard | |
| 2012/0196085 | A1 | 8/2012 | Langan et al. | |
| 2014/0131987 | A1 | 5/2014 | Royle | |
| 2015/0029289 | A1 | 1/2015 | Rosner et al. | |
| 2016/0031228 | A1 | 2/2016 | Will et al. | |
| 2019/0193446 | A1 * | 6/2019 | Ramsden | B41M 5/0355 |
| 2020/0147996 | A1 * | 5/2020 | Moalli | B41M 5/0353 |
| 2023/0039544 | A1 * | 2/2023 | Humenick | B41M 5/03 |

OTHER PUBLICATIONS

Invitation to Pay Additional Fees on PCT Application PCT/US2022/046816 dated Jan. 5, 2023 (2 pages).

International Search Report and Written Opinion on PCT App.PCT/US2022/046816 dated Mar. 10, 2023 (16 pages).

* cited by examiner

100

200

300

400

500

600

700

800

SYSTEMS AND METHODS FOR AN IN-LINE TEXTURE APPARATUS

CROSS-REFERENCE TO RELATED APPLICATIONS

This application claims the benefit of and priority to U.S. Provisional Application No. 63/272,105, filed Oct. 26, 2021, the entire disclosure of which is incorporated by reference herein.

TECHNICAL FIELD

This application is directed generally towards a dye sublimation apparatus (also referred to as a dye sublimation machine) and more specifically towards systems and methods for a dye sublimation machine with in-line texture application.

BACKGROUND

Dye sublimation is a process of infusing images into a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel into the substrate, where the dyes gets deposited as solids. This sublimation process therefore infuses the image in the printed paper into the substrate. As the infused image is embedded within the substrate, the image may not chip, fade, or delaminate like the capped and printed images.

A dye sublimation apparatus may have a heating section to generate the heat for sublimating the dyes such that the dye can travel from the printed paper (or printed sheet) into the substrate. For example, FIG. 1 shows a conventional heating section 100 of a conventional dye sublimation apparatus. As shown, the heating section 100 includes a bed 102, a substrate 104, a printed sheet 106, a membrane 108, and a bank of heaters 110. The membrane 108 applies pressure to press the printed sheet 106 onto the substrate 104, and the bank of heaters generates a radiating heat to heat a printed sheet 104, thereby transferring the dyes from the printed sheet 106 into the substrate 104.

However, the aforementioned conventional method has several technical shortcomings with regard to patterned or textured substrates. For example, due in part to pressure from the membrane 108, if the substrate 104 is textured prior to the dye sublimation process, the substrate 104 is likely to lose some of the texture during the dye sublimation. Furthermore, if the substrate is textured prior to dye sublimation, it is more difficult and expensive to produce textured and dye-sublimated substrates in small quantities, as pre-textured substrates require unique and specialized manufacturing processes.

As such, a significant improvement upon a process for producing textured substrates is desired.

SUMMARY

What is therefore desired are dye sublimation systems and methods with in-line texture application. What is further desired are dye sublimation systems and methods that provide texture or design to a substrate during the dye sublimation process in order to improve the quality of the texture.

Embodiments described herein attempt to solve the aforementioned technical problems and may provide other benefits as well. An illustrative dye sublimation machine (also referred to as a dye sublimation apparatus) may be a dye sublimation machine with in-line texture application, such that the dye sublimation machine features a texture sheet to be included with a printed sheet and substrate combination under a membrane. The texture sheet may feature any number of textures and/or design, and is made of a solid and inflexible material. Because the texture sheet is included underneath the membrane, the texture sheet is similarly pressed into the substrate, thereby pressing a texture (or design) into the substrate as the substrate is simultaneously undergoing dye sublimation. Furthermore, because the texture sheet is being pressed into the substrate while the substrate is heated, the substrate is more impressionable and the texture sheet is able to more effectively transfer the desired texture or design.

In one embodiment, a dye sublimation apparatus for infusing an image on a printed sheet into a substrate, the dye sublimation apparatus comprising a heating section configured to receive the printed sheet, the substrate, and a texture sheet, the texture sheet comprising a pattern; a membrane configured to cover the printed sheet, substrate, and texture sheet, the membrane coupled to a vacuum pump configured to control a pressure applied by the membrane to the printed sheet, substrate, and texture sheet; a controller configured to transmit control signals to the vacuum pump to dynamically adjust the pressure applied by the membrane; the heating section comprising a heater bank configured to heat the printed sheet to sublimate one or more dyes forming the image, such that the one or more dyes travel into the substrate in a gaseous state and deposit on the substrate in a solid state to infuse the image into the substrate; and the texture sheet configured to apply the pattern to the substrate.

In another embodiment, a dye sublimation method for infusing an image on a printed sheet to a substrate includes providing the substrate on a bed of a dye sublimation apparatus; providing the printed sheet on the substrate; providing a textured sheet on the printed sheet; applying, via a membrane over the textured sheet, the printed sheet, and the substrate, pressure to the printed sheet, the substrate, and the texture sheet; heating, by a heat section of the dye sublimation apparatus, the printed sheet to sublimate one or more dyes forming the image, such that the one or more dyes travel into the substrate in a gaseous state and deposit into the substrate in a solid state to infuse the image into the substrate; and dynamically adjusting, while heating the printed sheet, the pressure applied by the membrane, wherein the texture sheet is configured to apply the pattern to the substrate.

In another embodiment, a dye sublimation apparatus for infusing images on printed sheets to a substrate includes a bed comprising a first heated plate and configured to receive a first printed sheet, the substrate, a second printed sheet, and a textured sheet, the first printed sheet and the second printed sheet positioned on opposite sides of the substrate and including one or more images and the textured sheet comprising a pattern. The dye sublimation apparatus further includes a membrane coupled to a vacuum pump, the vacuum pump configured to control the pressure applied by the membrane to the printed sheet, substrate, and texture sheet; a controller configured to transmit control signals to the vacuum pump to dynamically adjust the pressure applied by the membrane; and a second heated plate, the first heated plate and the second heated plate positioned on opposing sides of the first printed sheet, the substrate, the second printed sheet, and the texture sheet, wherein the first heated plate and the second heated plate are configured to heat the first printed sheet and the second printed sheet to sublimate one or more dyes forming the one or more images, such that the one or more dyes travel into the substrate in a gaseous state and deposit into the substrate in a solid state to infuse the one or more images into the substrate, and the texture sheet configured to apply the pattern to the substrate.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
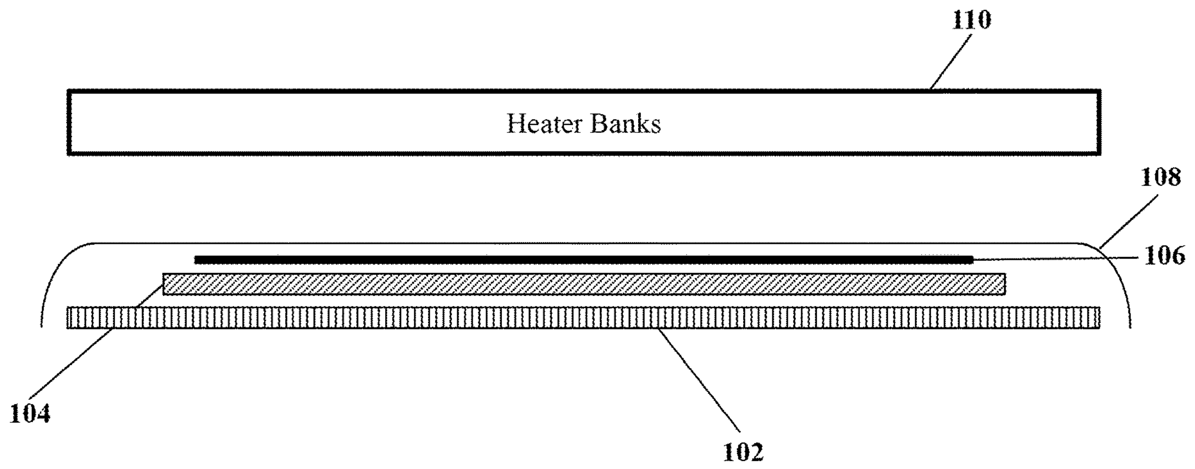
FIG. 1 PRIOR ART
FIG. 1 shows an example of a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part herein. Other embodiments may be used and/or other changes may be made without departing from the spirit or scope of the present disclosure. The illustrative embodiments described in the detailed description are not meant to be limiting of the subject matter presented here.

Embodiments disclosed herein describe an improved dye sublimation machine with a more efficient and versatile ability to apply a texture or design to a substrate during the dye sublimation process. More specifically, the dye sublimation machine may feature a textured sheet included with a printed sheet and substrate combination underneath a pressure-applying membrane. The improved dye sublimation machine features a texture sheet that, when included underneath the membrane with the printed sheet and substrate combination, provides a texture or design onto the substrate that holds and remains visible after the dye sublimation process is complete. The texture sheet may be made of any rigid or inflexible material and may be structured to provide any number of patterns or textures onto the substrate. A 'texture' is physical surface structure created by a mechanical transfer tool. Texture is a physical characteristic of a surface, and describes the way a surface feels to the touch. Texture influences the physical surface structure and appearance of a surface but does not change the build-up or chemical composition of the finished product (e.g., substrate having undergone dye sublimation).

Figure 2:
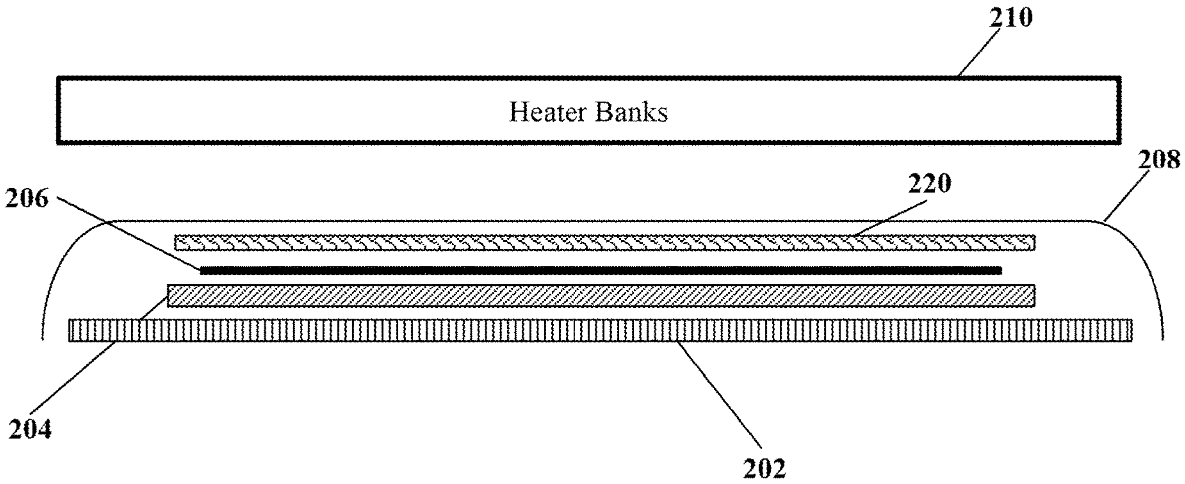
FIG. 2 shows an illustrative dye sublimation apparatus with in-line texture application, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a bed 202, which may provide structural support for the components of the dye sublimation machine 200. The bed 202 is structured to receive a printed sheet 206, a substrate 204, and a texture sheet 220, all of which are covered by a membrane 208. The printed sheet 206 may have an image thereon printed using sublimation inks containing sublimation dyes. The substrate 204 may be of any type of material such as thermoplastic where the image may be infused through the dye sublimation process. The combination of the printed sheet 206, the substrate 204, and texture sheet 220 may be loaded onto the bed 202, which may be formed by a graphite honeycomb structure.

The texture sheet 220 may be made of any rigid and heat-resistant material, such that the texture sheet 220 does not lose its shape or size when subjected to heat and pressure. The texture sheet 220 further includes a texture or pattern on at least one side that is structured to apply a reverse image (i.e., mirror-image) of that texture onto the substrate 204. The texture sheet 220 applies a reverse image of the texture because of the orientation of the texture sheet 220—the side of the texture sheet 220 applying the image is, in the dye sublimation machine 200, the relative bottom side, while the side of the substrate 204 receiving the image is the relative top. Alternatively, in other embodiments (not pictured), the texture sheet 220 is placed below the substrate 204 (i.e., the texture sheet 220 is directly proximate the bed 202), with at least one of the textured sides positioned upward, such that a texture from the texture sheet 220 is applied to the relative bottom of the substrate 204. In further embodiments, there is a texture sheet 220 placed above and below the substrate 204 and printed sheet 206 combination (i.e., the order of components from relative bottom to top is bed 202, a first texture sheet 220, substrate 204, printed sheet 206, a second texture sheet 220, and the membrane 208), such that a texture is applied to both the relative top and bottom of the substrate 204.

Furthermore, because the texture sheet 220 is a separate component, different texture sheets can be used interchangeably on throughout the same production run. For example, if a client requests different patterns to be applied to a run of fifty of the same substrate (i.e., same size and composition), two or more different texture sheets may be used interchangeably throughout the run without having to manufacture different pre-textured substrates. Similarly to how a different printed sheet is placed for each substrate, a different texture sheet may be placed for each substrate.

The texture sheet 220 may be manufactured in a number of ways. The texture sheet 220 may be sand-casted, formed via an injection mold, machine-printed (additive printed), or through another analogous molding technique, such that the mold defines a pattern or texture. The texture sheet 220 may also be lathed, whittled, or otherwise carved out of a solid piece of material, such that the carved-out portions define a pattern or texture.

The dye sublimation machine 200 may comprise one or more heater elements. As shown in FIG. 2, the dye sublimation machine 200 comprises a heater bank 210 positioned above the bed 202. Although the illustrative dye sublimation machine 200 is shown to comprise a single heater element positioned above the bed 202, any number of heater elements (e.g., a single heater element, three heater elements, etc.) may be included and may be located anywhere throughout the dye sublimation machine 200 (e.g., a single heater element located below the sublimation bed 202).

Within the dye sublimation machine, a membrane 208 may cover the combination of the printed sheet 206, the substrate 204, and the texture sheet 220. The membrane 208 may be formed by any kind of material that may withstand the heat for repeated heating cycles in the dye sublimation machine 200. A vacuum pump may pull down the membrane 208 such that the membrane 208 may cover the combination of the printed sheet 206, the substrate 204, and the texture sheet 220 snugly without air bubbles.

In an illustrative operation, a worker may place the substrate 204 on the bed 202, place the printed sheet 206 directly on the substrate 204, and place the texture sheet 220 directly on the printed sheet 206 and substrate 204 combination. Within the dye sublimation machine 200, the vacuum pump may pull a vacuum between the membrane 208 and the bed 202 such that the membrane 208 presses down on the texture sheet 220, and the pattern on the texture sheet 220 is applied to the substrate 204. The heater bank 210 may generate a requisite amount heat to sublimate the ink on the printed sheet 206. The sublimated ink may then be deposited into the substrate 204. The heat from the heater bank 210 also warms the substrate 204, thereby softening the substrate 204 and improving the application of the texture from the texture sheet 220. The sensors may measure the temperature at different spots within the enclosure created by the membrane 208 and the bed 202 and the temperature measurements may be used by the heater bank 210 to regulate the generated heat. After the combination of the printed sheet 206, the substrate 204, and texture sheet 220 are left in the dye sublimation machine 200 for a requisite amount of time (e.g., based upon the properties of the substrate 204, based on the desired texture, based on the temperature, or based on another parameter), the worker removes the combination of the printed sheet 206, the substrate 204, and the texture sheet 220. The worker may remove just the printed sheet 206 and substrate 204, and the texture sheet 220 can remain in the dye sublimation machine 200. After this process, the image in the printed sheet 206 may be infused (or deposited) into the substrate 204, and the pattern or texture from the texture sheet may be applied to the substrate 204.

In an alternative embodiment (not pictured), a texture sheet 220 is not included in the dye sublimation machine 200, and is pressed into the substrate 204 immediately following the dye sublimation process. Because the texture sheet 220 is being pressed into the substrate 204 while the substrate 204 is still (relatively) warm, the effectiveness of the texture application is still improved. The texture sheet 220 may be pressed into the substrate 204 via a hydraulic press, a weighted press, or any manner of mechanism that is structured to apply a significant amount of downward force.

In either embodiment, the resultant product (i.e., the substrate 204 after being removed from the dye sublimation machine 200) is both infused with an image and textured. Traditionally, resultant products are either one or the other, as the infusion process (e.g., dye sublimation) traditionally removes any texture that may have been pre-applied to the substrate, such that the resultant product is a flat infused substrate. Alternatively, the substrate may be textured (e.g., the substrate is heated and the texture is applied) but cannot then be infused due to the above-identified issues. By performing the image-infusion and texture-application steps concurrently (or in close succession), the present systems and methods allow for textured and infused substrates not possible in traditional methods.

Figure 3:
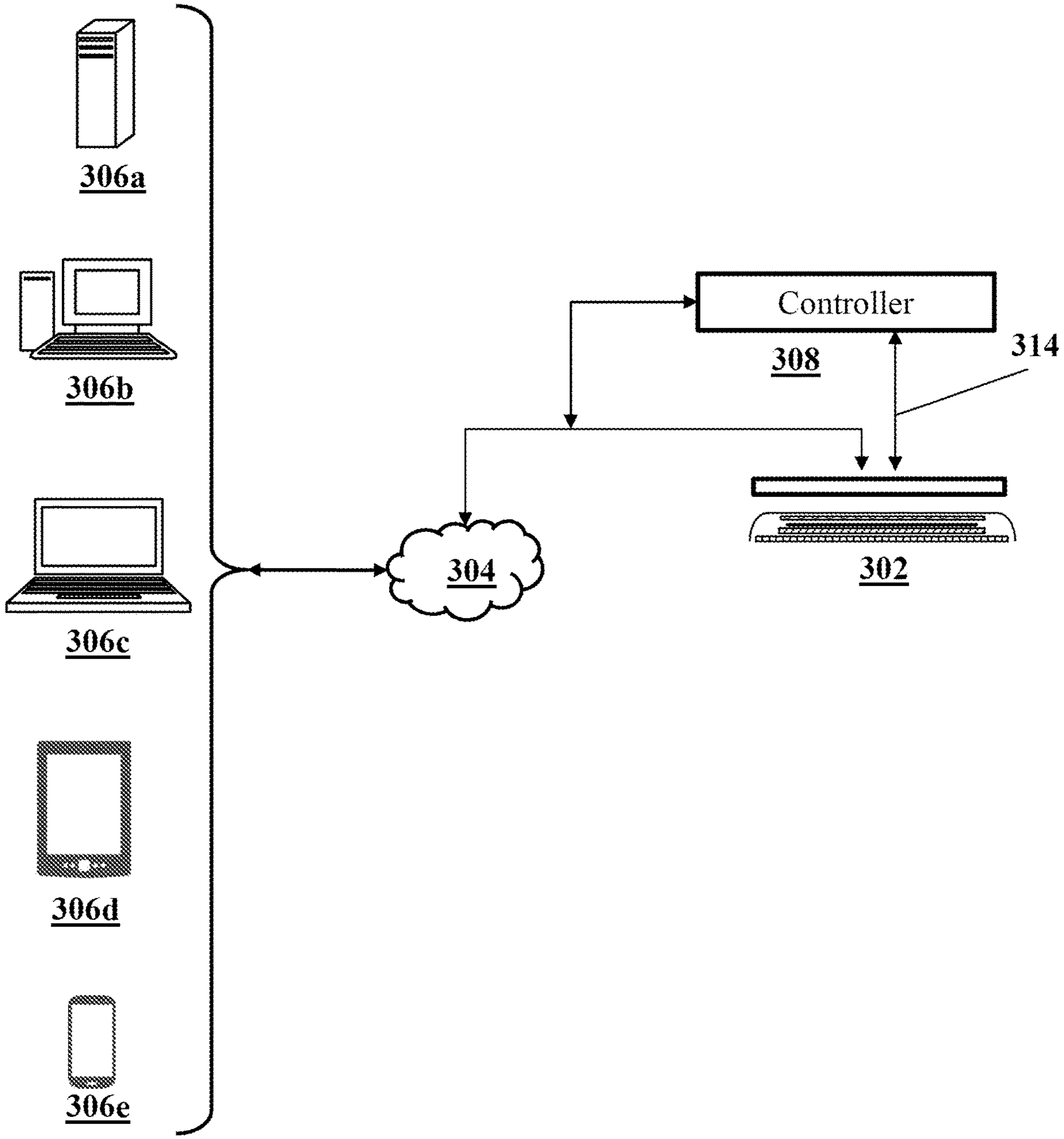
FIG. 3 shows an illustrative system for dye sublimation, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306*a*, 306*b*, 306*c*, 306*d*, 306*e* (collectively or commonly referred to as 306), and a controller 308. The dye sublimation apparatus 302 may share one or more features of the dye sublimation machine 200. It should be understood that the system 300 and the aforementioned components are merely for illustration and systems with additional, alternative, and a fewer number of components should be considered within the scope of this disclosure.

The dye sublimation apparatus 302 may be a combination of components that may simultaneously infuse (or dye sublimate) an image from a printed sheet into a substrate and apply a texture (or pattern) from a texture sheet to the substrate. The image may be printed using sublimation inks containing sublimation dyes that may transform from solid state to gaseous state when heated to a predetermined temperature. The sublimation dyes may travel into the substrate and deposit therein thereby creating an infused image within the substrate. The texture sheet is pressed into the heated substrate at the same time, thereby applying the texture (or pattern) on the texture sheet into the substrate. The pressure on the texture sheet may be generated by a membrane surrounding the substrate, printed sheet, and texture sheet, and a vacuum pump that creates a pressurized and snug fit for the membrane. For the heating part of the dye sublimation process, the dye sublimation apparatus 302 may include a heater bank.

The heater bank and vacuum pump may be controlled by a controller 308. The single controller 308 is shown merely for illustration and there may be a plurality of controllers 308 controlling the heater bank and vacuum pump. More particularly, the controller 308 may regulate the heat generated by the heater bank, and may regulate an amount of suction generated by the vacuum pump. For example, the controller 308 may increase the heat, decrease the heat, turn ON, or turn OFF the heater bank. In another example, the controller 308 may increase the suction, decrease the suction, turn ON, or turn OFF the vacuum pump in order to affect the pressure applied on the texture sheet and adjust a depth of the applied texture. The controller 308 may be any kind of hardware and/or software controller, including, but not limited to PID (proportional-integral-derivative) controller and/or any other type of controller. The controller 308 may continuously receive a feedback from the items being heated (e.g., printed sheet, substrate) through a connection 314. The connection 314 may be wired, e.g., a wired connection from a plurality of sensors providing the feedback to the controller 308, or wireless, e.g., a plurality of sensors wirelessly providing the feedback to the controller 308.

In addition to the controller 308, the heater bank and vacuum pump may be controlled based upon instructions provided by a computing device 306. For example, the computing device 306 may include an interface for a user to enter a desired amount of bed temperature for a particular image and the computing device 306 may provide instructions to the heater bank through the network 304 to maintain the temperature in the dye sublimation apparatus 302. Alternatively or additionally, the computing device 306 may provide the instruction to maintain the temperature to the controller 308. In another example, the computing device 306 may include an interface for a user to enter a desired depth of texture for a particular texture and the computing device 306 may provide instructions to the heater bank through the network 304 to maintain the pressure by the membrane (via the vacuum pump) to achieve the desired texture depth. It should be understood that the instructions to maintain the temperature/pressure and the process of maintaining the temperature/pressure may be maintained either in hardware, e.g., through the controller 308, or as a combination of hardware and software, e.g., through one or more applications in the computing device 306, the controller 308, and/or other hardware components in the dye sublimation apparatus. Furthermore, in some embodiments, the controller 308 may control the temperature and pressure in tandem. For example, the pressure is not increased until the temperature has reached peak dye sublimation temperature so that the texture sheet is not prematurely pressed into the substrate.

The computing device 306 may include any type processor based device that may execute one or instructions (e.g., instructions to cause a uniform temperature distribution in the dye sublimation apparatus 302) to the dye sublimation apparatus 302 through the network 304. Non-limiting examples of the computing device 306 includes a server 306*a*, a desktop computer 306*b*, a laptop computer 306*c*, a tablet computer 306*d*, and a smartphone 306*e*. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be any kind of local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope this disclosure. For example, the network 304 may be a single wired connection between a computing device 306 and the dye sublimation apparatus 302.

Figure 4:
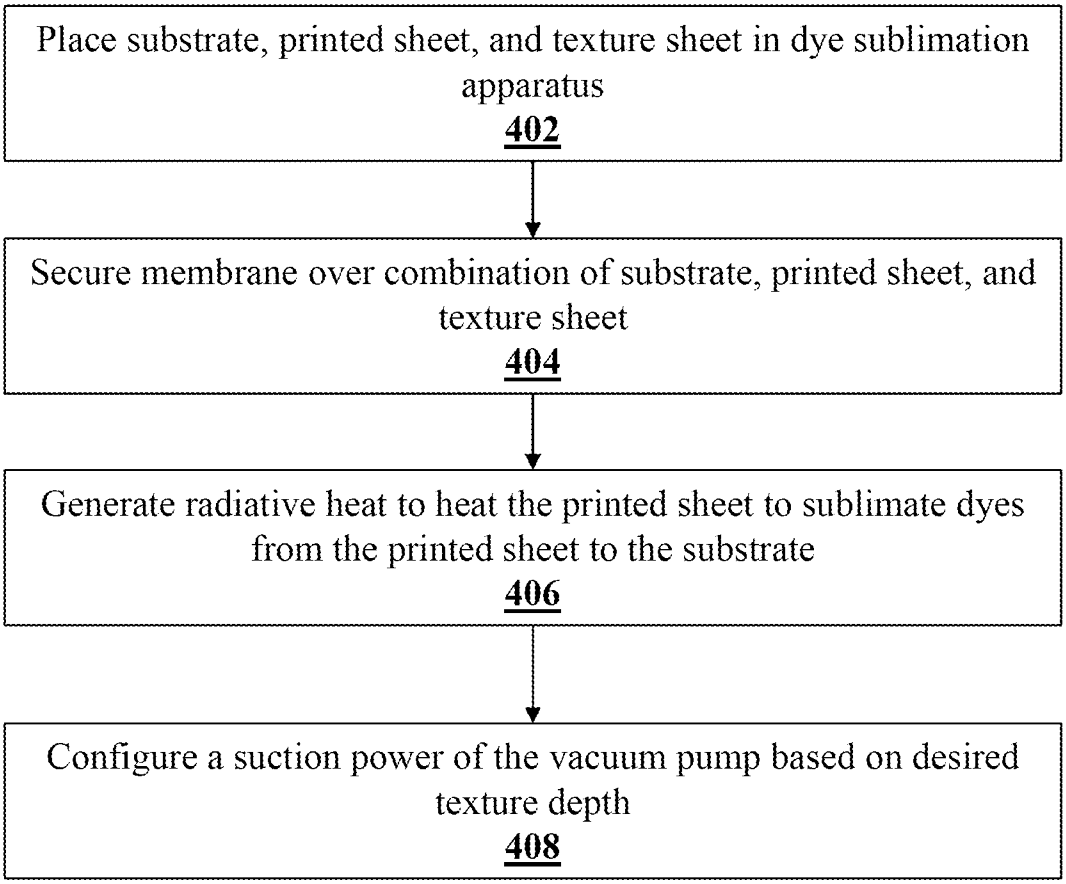
FIG. 4 a flow diagram of an illustrative method for dye sublimation, according to an embodiment.

FIG. 4 shows a flow diagram of an illustrative method 400 for dye sublimation, according to an embodiment. The steps of the method 400 described herein are merely illustrative and methods with alternative, additional, and fewer number of steps should also be considered within the scope of this disclosure.

The method may begin at step 402 where a user places a substrate on a bed in a dye sublimation apparatus, places a printed sheet on the substrate, and places a texture sheet on the printed sheet.

At step 404, a membrane is secured over the combination of the substrate, printed sheet, and texture sheet, and a vacuum pump is engaged to pull down the membrane snugly over the combination. In this way, there is substantially no air between the substrate and printed sheet or the printed sheet and texture sheet, and the texture sheet begins to be pressed into the substrate.

At step 406, a heater bank may generate radiative heat (also referred to as radiating heat), which is redirected throughout the dye sublimation apparatus to heat the printed sheet to sublimate dyes from the printed sheet into the substrate.

Optionally at step 408, a suction power of the vacuum pump is configured in order to affect the applied pressure by the membrane on the combination. By affecting the pressure, the depth of the applied texture on the substrate from the texture sheet may be controlled (e.g., to a desired depth). In some embodiments, the suction power is increased by a processor to align with a desired increased texture depth. It should be understood that the term "processor" as used herein may include microprocessors that generate control instructions and controllers that generate control signals. In some embodiments, the processor may maintain a target pressure for the membrane throughout the sublimation cycle. In other embodiments, the processor may dynamically configure the pressure for the membrane during the sublimation cycle (e.g., increasing the pressure as the temperature increases).

Some embodiments disclosed herein describe an improved dye sublimation machine with a more efficient and versatile ability to infuse an image into both sides of a substrate during the dye sublimation process. More specifically, the dye sublimation machine may feature a heated plate in the place of a traditional bed on which the substrate and one or more printed sheets are placed. By including a heated plate beneath the substrate and printed sheets, the improved dye sublimation machine provides a second source of heat that can facilitate infusion of an image from a second printed sheet. In other embodiments, the traditional heater bank above the substrate and printed sheet combination is replaced by a second heated plate.

Figure 5:
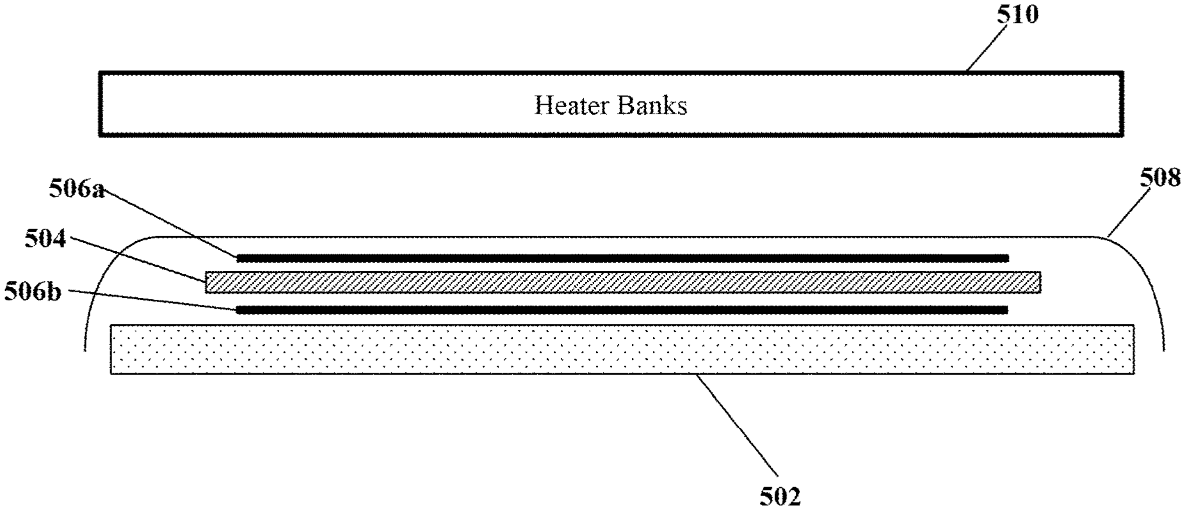
FIG. 5 shows an illustrative dye sublimation apparatus with double-sided image infusion, according to an embodiment.

FIG. 5 shows an illustrative dye sublimation machine (also referred to as dye sublimation apparatus) 500, according to an embodiment. It should be understood that the dye sublimation machine 500 shown in FIG. 5 and described herein is merely for illustration and explanation and machines with other form factors and components should also be considered within the scope of this disclosure. For example, dye sublimation machines having additional, alternative, or a fewer number of components than the illustrative dye sublimation machine 500 should be included within the scope of this disclosure. The dye sublimation machine 500 may share one or more features as the dye sublimation machine 200.

The dye sublimation machine 500 may comprise a heated plate 502, which may provide structural support and heat for the components of the dye sublimation machine 200. The heated plate 502 is structured to receive a first printed sheet 506*a*, a substrate 504, and a second printed sheet 506*b*, all of which are covered by a membrane 508. The first printed sheet 506*a* and second printed sheet 506*b* (collectively referred to as the printed sheets 506) may each have an image thereon printed using sublimation inks containing sublimation dyes. In some embodiments, the first printed sheet 506*a* and the second printed sheet 506*b* have the same image thereon printed (such that the finished substrate 504 has the same image on both sides), while in other embodiments, the first printed sheet 506*a* and the second printed sheet 506*b* have different images thereon printed (such that the finished substrate 504 has different images on each side). The substrate 504 may be of any type of material such as thermoplastic where the image may be infused through the dye sublimation process.

The combination of the first printed sheet 506*a*, second printed sheet 506*b*, and the substrate 504 may be loaded onto the heated plate 502. The heated plate 502 may comprise any smooth surface that can conduct heat and support the substrate 504 and printed sheets 506, such as a metal or cast iron sheet. The heated plate 502 further includes one or more heater elements that warm the surface of the heated plate 502. The one or more heater elements may be a set of heated coils that receive an electric current that generates heat, which radiates out from the heated coils, or may include one or more gas burners that receive a flow of natural gas that generates flames and heats the heated plate 502 surface.

The dye sublimation machine 500 may comprise one or more radiating heater elements. As shown in FIG. 5, the dye sublimation machine 500 comprises a heater bank 510 positioned above the heated plate 502. Although the illustrative dye sublimation machine 500 is shown to comprise a single heater element positioned above the heated plate 502, any number of heater elements (e.g., a single heater element, three heater elements, etc.) may be included and may be located anywhere throughout the dye sublimation machine 500 in order to provide heat to the top of the substrate 504 and printed sheets 506.

By providing heat from both above and below the substrate 504 and printed sheets 506 combination, the dye sublimation machine 500 enables simultaneous infusion of images into either side of the substrate 504, which would not otherwise be possible. In current dye sublimation machines that only include a single heat source above the substrate and printed sheet combination, the heat energy from the single heat source is insufficient to heat an underneath printed sheet (e.g., the second printed sheet 506*b*) due to the density of the substrate. If the amount of heat energy from the single heat source is increased in order to heat the underneath printed sheet, the top printed sheet (e.g., the first printed sheet 506*a*) is likely to be burned. As such, there is no way to reliably perform "double-sided infusion" (i.e., infusing images into two sides of a substrate with two separate printed sheets simultaneously) with current technology.

Within the dye sublimation machine, a membrane 508 may cover the combination of the first printed sheet 506*a*, the substrate 504, and the second printed sheet 506*b*. The membrane 508 may be formed by any kind of material that may withstand the heat for repeated heating cycles in the dye sublimation machine 200. A vacuum pump may pull down the membrane 508 such that the membrane 508 may cover the combination of first printed sheet 506*a*, the substrate 504, and the second printed sheet 506*b* snugly without air bubbles.

In an illustrative operation, a worker may place the second printed sheet 506*b* on the heated plate, place the substrate 504 directly on the second printed sheet 506*b*, and place the first printed sheet 506*a* directly on the substrate 504. Within the dye sublimation machine 500, the vacuum pump may pull a vacuum between the membrane 508 and the heated plate 502 such that the membrane 508 presses down the substrate 504 and printed sheets 506. The heated plate 502 and heater bank 510 may generate a requisite amount heat to sublimate the ink on the second printed sheet 506*b* and the first printed sheet 506*a* respectively. The sublimated ink may then be deposited into the substrate 504. The sensors may measure the temperature at different spots within the enclosure created by the membrane 508 and the heated plate 502 and the temperature measurements may be used by the heated plate 502 and the heater bank 510 to regulate the generated heat. After the combination of the first printed sheet 506*a*, the substrate 504, and the second printed sheet 506*b* are left in the dye sublimation machine 500 for a requisite amount of time (e.g., based upon the properties of the substrate 504, based on the desired image quality, based on the temperature within or of one of the components of the dye sublimation machine 500, or based on another parameter), the worker removes the combination of the first printed sheet 506*a*, the substrate 504, and the second printed sheet 506*b*. After this process, the image in the first printed sheet 506*a* may be infused (or deposited) into a top surface of the substrate 504, and the image in the second printed sheet 506*b* may be infused (or deposited) into a bottom surface of the substrate 504, such that the image from the first printed sheet 506*a* appears on the top surface of the substrate 504 and the image from the second printed sheet 506*b* appears on the bottom surface of the substrate 504.

Figure 6:
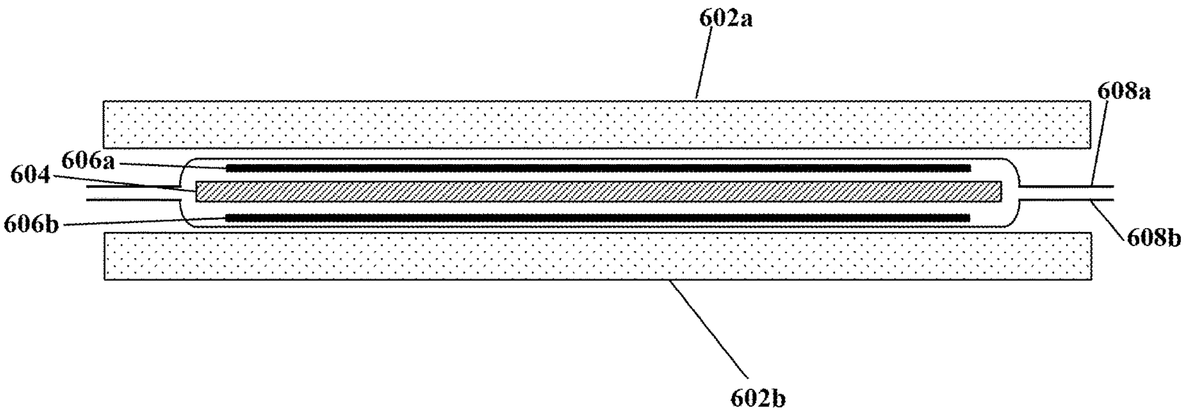
FIG. 6 shows an illustrative dye sublimation apparatus with double-sided image infusion, according to an embodiment.

FIG. 6 shows an illustrative dye sublimation machine (also referred to as dye sublimation apparatus) 600, according to an embodiment. It should be understood that the dye sublimation machine 600 shown in FIG. 6 and described herein is merely for illustration and explanation and machines with other form factors and components should also be considered within the scope of this disclosure. For example, dye sublimation machines having additional, alternative, or a fewer number of components than the illustrative dye sublimation machine 600 should be included within the scope of this disclosure. The dye sublimation machine 600 may share one or more features as the dye sublimation machine 200.

The dye sublimation machine 600 may comprise a first heated plate 602*a*, which may provide heat for the components of the dye sublimation machine 600, and a second heated plate 602*b*, which may provide structural support and heat for the components of the dye sublimation machine 600. The second heated plate 602*b* is structured to receive a first printed sheet 606*a*, a substrate 604, and a second printed sheet 606*b*. The first printed sheet 606*a* and second printed sheet 606*b* (collectively referred to as the printed sheets 606) may each have an image thereon printed using sublimation inks containing sublimation dyes. In some embodiments, the first printed sheet 606*a* and the second printed sheet 606*b* have the same image thereon printed (such that the finished substrate 604 has the same image on both sides), while in other embodiments, the first printed sheet 606*a* and the second printed sheet 606*b* have different images thereon printed (such that the finished substrate 604 has different images on each side). The substrate 604 may be of any type of material, such as thermoplastic or fabric, where the image(s) may be infused through the dye sublimation process.

As shown in FIG. 6, the combination of the substrate 604 and the printed sheets 606 are surrounded by a first membrane 608*a* and a second membrane 608*b* (collectively referred to as a double membrane 608). The first membrane 608*a* and the second membrane 608*a* may be formed by any kind of material that may withstand the heat for repeated heating cycles in the dye sublimation machine 600. A vacuum pump may pull the first membrane 608*a* down and the first membrane 608*b* up such that the combination of first printed sheet 606*a*, the substrate 604, and the second printed sheet 606*b* is surrounded by the double membrane 608 snugly without air bubbles. Generally, the double membrane 608 is used to maintain a pressure on the first printed sheet 606*a*, the substrate 604, and the second printed sheet 606*b* in order to keep the printed sheets 606 in snug contact with the substrate 604 during the dye sublimation process. The double membrane 608 here is technologically beneficial because the double membrane 608 improves the consistency of pressure applied to the top and bottom by having separate membranes (i.e., the first membrane 608*a* and the second membrane 608*b*) each apply pressure to the separate printed sheets (i.e., the first printed sheet 606*a* and the second printed sheet 606*b*, respectively). However, in some embodiments (not pictured), the double membrane 608 is only a single membrane (i.e., either the first membrane 608*a* alone or the second membrane 608*b* alone) or is omitted entirely, such that pressure is instead applied by the first heated plate 602*a* and the second heated plate 602*b*.

The combination of the first printed sheet 606*a*, second printed sheet 606*b*, and the substrate 604 may be loaded between the first heated plate 602*a* and the second heated plate 602*b*. The first heated plate 602*a* and the second heated plate 602*b* may comprise any smooth surface that can conduct heat and support the substrate 604 and printed sheets 606, such as a metal or cast iron sheet. The first heated plate 602*a* and the second heated plate 602*b* further include one or more heater elements that warm the surface of the first heated plate 602*a* and the second heated plate 602*b*. The one or more heater elements may be a set of heated coils that receive an electric current that generates heat, which radiates out from the heated coils, or may include one or more gas burners that receive a flow of natural gas that generates flames and heats the surfaces of the first heated plate 602*a* and the second heated plate 602*b*.

In some embodiments, the first heated plate 602*a* and the second heated plate 602*b* are stationary or fixed, such that the substrate 604 and printed sheets 606 combination is placed between the first heated plate 602*a* and the second heated plate 602*b*, and any pressure on the combination is applied via the double membrane 608. In other embodiments, at least one of the first heated plate 602*a* and the second heated plate 602*b* are movable, such that the substrate 604 and printed sheets 606 combination is placed on the second heated plate 602 and then one or both of the first heated plate 602*a* and the second heated plate 602*b* move. The second heated plate 602*b* may move upwards, the first heated plate 602*a* may move downwards, or both the first heated plate 602*a* and the second heated plate 602*b* may move towards each other in order to reduce a distance between the first heated plate 602*a* and the substrate 604 and printed sheets 606 combination. In some embodiments, the first heated plate 602*a* and/or the second heated plate 602*b* move until the first heated plate 602*a* is a pre-defined distance (e.g., 1") from the substrate 604 and printed sheets 606 combination. In other embodiments, the first heated plate 602*a* and/or the second heated plate 602*b* move until the first heated plate 602*a* is in contact with the substrate 604 and printed sheets 606 combination. In these embodiments, the moving first heated plate 602*a* and/or second heated plate 602*b* apply a pressure to the substrate 604 and printed sheets 606 combination, which allows the double membrane 608 to be omitted.

In some embodiments, the first heated plate 602*a* and the second heated plate 602*b* may each be mechanically coupled to a motor that provides a driving force to the first heated plate 602*a* and/or the second heated plate 602*b*. In these embodiments, a worker loads the substrate 604 and printed sheets 606 combination onto the second heated plate 602*b*, and at least one motor (i.e., a motor coupled to the first heated plate 602*a* and/or a motor coupled to the second heated plate 602*b*) is engaged to move one or both of the first heated plate 602*a* and the second heated plate 602*b*. The at least one motor may be automatically engaged (e.g., upon sensing that the substrate 604 and printed sheets 606 combination is in place via a sensor) or may be engaged by the worker (e.g., pressing a button on the dye sublimation machine 600, entering a command on a computer coupled to the dye sublimation machine 600, etc.). In other embodiments, the first heated plate 602*a* and the second heated plate 602*b* are mechanically coupled to a hand-crank or similar mechanism, such that the first heated plate 602*a* and the second heated plate 602*b* are able to be manually moved by a worker. In these embodiments, the worker loads the substrate 604 and printed sheets 606 combination onto the second heated plate 602*b* and engages the hand-crank to move the first heated plate 602*a* and the second heated plate 602*b* into position.

By providing heat from both above and below the substrate 604 and printed sheets 606 combination, the dye sublimation machine 600 enables simultaneous infusion of images into either side of the substrate 604, which would not otherwise be possible. In current dye sublimation machines that only include a single heat source above the substrate and printed sheet combination, the heat energy from the single heat source is insufficient to heat an underneath printed sheet (e.g., the second printed sheet 606*b*) due to the density of the substrate. If the amount of heat energy from the single heat source is increased in order to heat the underneath printed sheet, the top printed sheet (e.g., the first printed sheet 606*a*) is likely to be burned. As such, there is no way to reliably perform "double-sided infusion" (i.e., infusing images into two sides of a substrate with two separate printed sheets simultaneously) with current technology.

Furthermore, by utilizing two heated plates (e.g., the first heated plate 602*a* and the second heated plate 602*b*) for simultaneous direct heat rather than one or more indirect heat sources that radiate heat (e.g., heater bank 510), the dye sublimation machine 600 provides more consistent and controllable heat, thereby improving the quality of the infused image. In addition, in those embodiments in which the first heated plate 602*a* and the second heated plate 602*b* are movable, the heated plates may provide pressure onto the substrate 604 and printed sheets 606 combination, which can not only improve the quality of the image infusion but also remove the necessity of including the membrane (e.g., the double membrane 608) and vacuum pump.

In an illustrative operation, a worker may place the second printed sheet 606*b* on the second membrane 608*b* on the second heated plate 602*b*, place the substrate 604 directly on the second printed sheet 606*b*, and place the first printed sheet 606*a* directly on the substrate 604. The first membrane 608*a* is then placed on the first printed sheet 606*a*, and the vacuum pump may pull a vacuum between the double membrane 608 such that the double membrane 608 presses down the substrate 604 and printed sheets 606 combination. From there, the first heated plate 602*a* and/or the second heated plate 602*b* are moved to an operating position, and then may generate a requisite amount heat to sublimate the ink on the first printed sheet 606*a* and the second printed sheet 606*b* respectively. The sublimated ink may then be deposited into the substrate 604. The sensors may measure the temperature at different spots within the enclosure created by the double membrane 608, the first heated plate 602*a*, and the second heated plate 602*b*, and the temperature measurements may be used by the first heated plate 602*a* and the second heated plate 602*b* to regulate the generated heat. After the combination of the first printed sheet 606*a*, the substrate 604, and the second printed sheet 606*b* are left in the dye sublimation machine 600 for a requisite amount of time (e.g., based upon the properties of the substrate 604, based on the desired image quality, based on the temperature within or of one of the components of the dye sublimation machine 600, or based on another parameter), the first heated plate 602*a* and the second heated plate 602*b* are moved apart, and the worker removes the combination of the first printed sheet 606*a*, the substrate 604, and the second printed sheet 606*b*. After this process, the image in the first printed sheet 606*a* may be infused (or deposited) into a top surface of the substrate 604, and the image in the second printed sheet 606*b* may be infused (or deposited) into a bottom surface of the substrate 604, such that the image from the first printed sheet 606*a* appears on the top surface of the substrate 604 and the image from the second printed sheet 606*b* appears on the bottom surface of the substrate 604.

Figure 7:
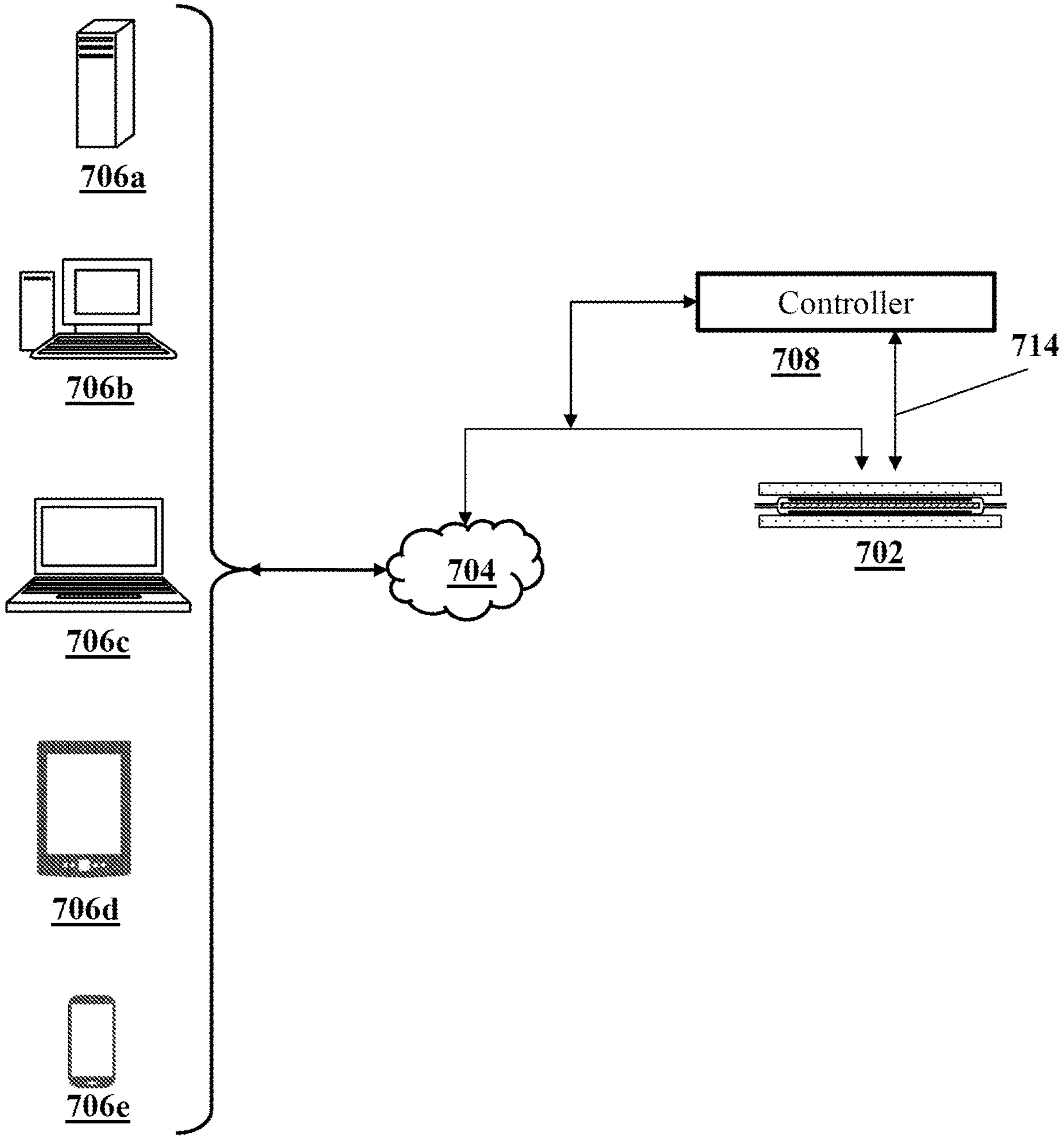
FIG. 7 shows an illustrative system for dye sublimation, according to an embodiment.

FIG. 7 shows an illustrative system 700 for dye sublimation, according to an embodiment. As shown, the system 700 may comprise a dye sublimation apparatus (also referred to as a dye sublimation machine) 702, a network 704, computing devices 706*a*, 706*b*, 706*c*, 706*d*, 706*e* (collectively or commonly referred to as 706), and a controller 708. It should be understood that the system 700 and the aforementioned components are merely for illustration and systems with additional, alternative, and a fewer number of components should be considered within the scope of this disclosure.

The dye sublimation apparatus 702 may be a combination of components that may simultaneously infuse (or dye sublimate) images from two separate printed sheets on either side of a substrate into the substrate. The images may be printed using sublimation inks containing sublimation dyes that may transform from solid state to gaseous state when heated to a predetermined temperature. The sublimation dyes may travel to the substrate and deposit therein thereby creating an infused image within the substrate. In order to provide sufficient heat to each printed sheet, the substrate and printed sheets are placed on a heated plate that can provide heat from below. In some embodiments, the dye sublimation apparatus 702 may include a heater bank that provides heat to the top of the substrate and printed sheets, while in other embodiments, the dye sublimation apparatus 702 includes a second heated plate on top of the substrate and printed sheets. A membrane is placed over the substrate and printed sheets and is pulled down toward the heated plate via a vacuum pump, which ensures a tight fit and consistent pressure on the substrate and printed sheets.

The heater bank, heated plate(s), and vacuum pump may be controlled by a controller 708. The single controller 708 is shown merely for illustration and there may be a plurality of controllers 708 controlling the heater bank and vacuum pump. More particularly, the controller 708 may regulate the heat generated by the heater bank, and may regulate an amount of suction generated by the vacuum pump. For example, the controller 708 may increase the heat, decrease the heat, turn ON, or turn OFF the heater bank and heated plate. In another example, the controller 708 may increase the suction, decrease the suction, turn ON, or turn OFF the vacuum pump in order to affect the pressure applied on the texture sheet and adjust a depth of the applied texture. The controller 708 may be any kind of hardware and/or software controller, including, but not limited to PID (proportional-integral-derivative) controller and/or any other type of controller. The controller 708 may continuously receive a feedback from the items being heated (e.g., printed sheet, substrate) through a connection 714. The connection 714 may be wired, e.g., a wired connection from a plurality of sensors providing the feedback to the controller 708, or wireless, e.g., a plurality of sensors wirelessly providing the feedback to the controller 708.

In addition to the controller 708, the heater bank, heated plate(s), and vacuum pump may be controlled based upon instructions provided by a computing device 706. For example, the computing device 706 may include an interface for a user to enter a desired amount of bed temperature for a particular image and the computing device 706 may provide instructions to the heater bank through the network 704 to maintain the temperature in the dye sublimation apparatus 702. Alternatively or additionally, the computing device 706 may provide the instruction to maintain the temperature to the controller 708. It should be understood that the instructions to maintain the temperature/pressure and the process of maintaining the temperature may be maintained either in hardware, e.g., through the controller 708, or as a combination of hardware and software, e.g., through one or more applications in the computing device 706, the controller 708, and/or other hardware components in the dye sublimation apparatus.

The computing devices 706 may include any type processor-based device that may execute one or more instructions (e.g., instructions to cause a uniform temperature distribution in the dye sublimation apparatus 702) to the dye sublimation apparatus 702 through the network 704. Non-limiting examples of the computing devices 706 include a server 706*a*, a desktop computer 706*b*, a laptop computer 706*c*, a tablet computer 706*d*, and a smartphone 706*e*. However, it should be understood that the aforementioned devices are merely illustrative and other computing devices should also be considered within the scope of this disclosure. At minimum, each computing device 706 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 706.

The network 704 may be any kind of local or remote network that may provide a communication medium between the computing devices 706 and the dye sublimation apparatus 702. For example, the network 704 may be a local area network (LAN), a desk area network (DAN), a metropolitan area network (MAN), or a wide area network (WAN). However, it should be understood that aforementioned types of networks are merely illustrative and any type of component providing the communication medium between the computing devices 706 and the dye sublimation apparatus 702 should be considered within the scope this disclosure. For example, the network 704 may be a single wired connection between a computing device 706 and the dye sublimation apparatus 702.

Figure 8:
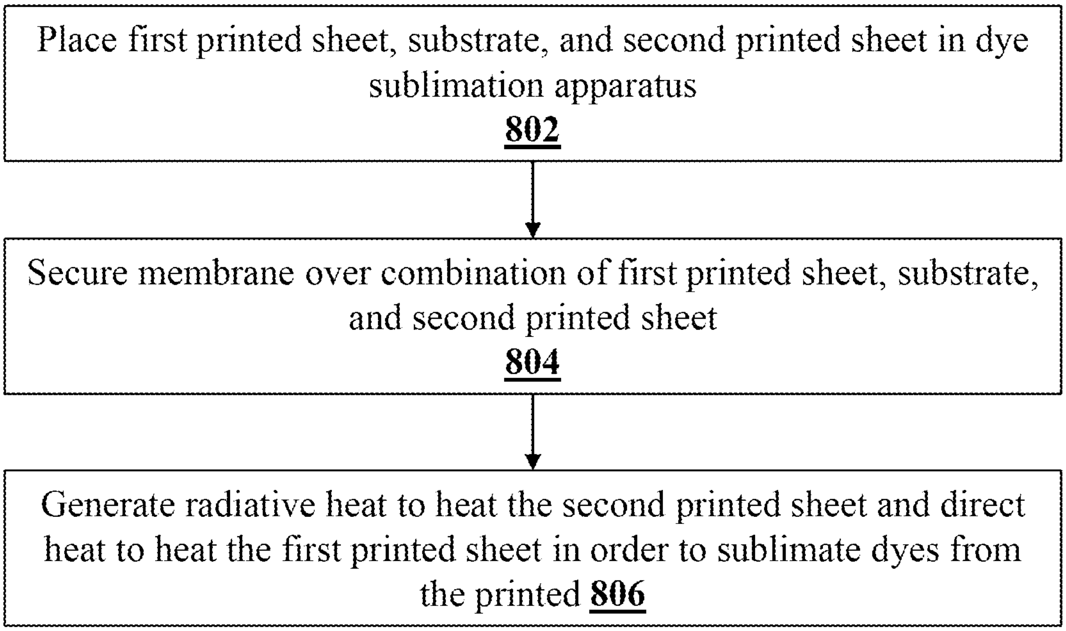
FIG. 8 shows a flow diagram of an illustrative method for dye sublimation, according to an embodiment.

FIG. 8 shows a flow diagram of an illustrative method 800 for dye sublimation, according to an embodiment. The steps of the method 800 described herein are merely illustrative and methods with alternative, additional, and fewer number of steps should also be considered within the scope of this disclosure.

The method may begin at step 802 where a user places a first printed sheet on a heated plate in a dye sublimation apparatus, places a substrate on the first printed sheet, and places a second printed sheet on the substrate.

At step 804, a membrane is secured over the combination of the first printed sheet, the substrate, and the second printed sheet, and a vacuum pump is engaged to pull down the membrane snugly over the combination. In this way, there is substantially no air between the substrate and the first printed sheet or the substrate and the second printed sheet.

At step 806, a heater bank may generate radiative heat (also referred to as radiating heat) and the heated plate may generate direct heat, which is used to heat the second printed sheet and the first printed sheet respectively to sublimate dyes from the printed sheets into the substrate.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing an image on a printed sheet to a substrate, the dye sublimation apparatus comprising:

a heating section configured to receive the printed sheet, the substrate, and a texture sheet, the texture sheet comprising a pattern;

a membrane configured to cover the printed sheet, the substrate, and the texture sheet, wherein the membrane is coupled to a vacuum pump configured to control a pressure applied by the membrane to the printed sheet, substrate, and texture sheet;

a controller configured to transmit control signals to the vacuum pump to dynamically adjust the pressure applied by the membrane during heating of the printed sheet;

the heating section comprising a heater bank configured to heat the printed sheet to sublimate one or more dyes forming the image, such that the one or more dyes travel into the substrate in a gaseous state and deposit into the substrate in a solid state to infuse the image into the substrate; and the texture sheet configured to apply the pattern to the substrate.

2. The dye sublimation apparatus of claim 1, wherein the pressure applied by the membrane is a variable pressure.

3. The dye sublimation apparatus of claim 2, further comprising:

a temperature sensor configured to measure a temperature of at least one of the printed sheet, the substrate, or the texture sheet, wherein the controller is further configured to transmit control signals to the vacuum pump to dynamically adjust the pressure applied by the membrane based on the temperature of the at least one of the printed sheet, the substrate, or the texture sheet.

4. The dye sublimation apparatus of claim 3, wherein the controller is configured to increase the pressure from a first pressure to a second pressure when the temperature of at least one of the printed sheet, the substrate, or the texture sheet, is at or above a dye sublimation temperature.

5. The dye sublimation apparatus of claim 1, wherein controller is further configured to control the vacuum pump to adjust the pressure applied by the membrane to a pressure that corresponds to a desired depth for the applied pattern.

6. The dye sublimation apparatus of claim 1, wherein the texture sheet is a first texture sheet, the dye sublimation apparatus further comprising:

a second texture sheet, wherein the first texture sheet and the second texture sheeting are positioned on opposing sides of the substrate.

7. The dye sublimation apparatus of claim 6, wherein the pattern is a first pattern, the second texture sheet comprising a second pattern, the second pattern different than the first pattern.

8. The dye sublimation apparatus of claim 1, wherein the printed sheet is a first printed sheet, the dye sublimation apparatus further comprising:

a second printed sheet comprising a second image, the second printed sheet received by the heating section, the first printed sheet and the second printed sheet positioned on opposite sides of the substrate; and the heating section further comprising a heated bed, the heated bed and the heater bank positioned on opposing sides of the substrate, wherein the heating bed is configured to heat the second printed sheet to sublimate one or more dyes forming the second image, such that the one or more dyes travel into the substrate in a gaseous state and deposit into the substrate in a solid state to infuse the second image into the substrate.

9. The dye sublimation apparatus of claim 1, wherein the membrane is a first membrane, the dye sublimation apparatus further comprising:

a second membrane, the first membrane and the second membrane positioned on opposing sides of the printed sheet, the substrate, and the texture sheet, wherein the second membrane is configured to cover the printed sheet, substrate, and texture sheet to apply pressure to the printed sheet, substrate, and texture sheet.

10. The dye sublimation apparatus of claim 9, wherein the first membrane and the second membrane are coupled to the vacuum pump to form a sealed enclosure around the printed sheet, the substrate, and the texture sheet.

11. A dye sublimation method for infusing an image on a printed sheet to a substrate, the dye sublimation method comprising:

providing the substrate on a bed of a dye sublimation apparatus;

providing the printed sheet on the substrate;

providing a textured sheet on the printed sheet;

applying, via a membrane over the textured sheet, the printed sheet, and the substrate, pressure to the printed sheet, the substrate, and the texture sheet;

heating, by a heat section of the dye sublimation apparatus, the printed sheet to sublimate one or more dyes forming the image, such that the one or more dyes travel into the substrate in a gaseous state and deposit into the substrate in a solid state to infuse the image into the substrate; and dynamically adjusting, while heating the printed sheet, the pressure applied by the membrane, wherein the texture sheet is configured to apply the pattern to the substrate.

12. The dye sublimation method of claim 11, further comprising:

dynamically adjusting, while heating the printed sheet, the pressure applied by the membrane via a vacuum pump coupled to the membrane.

13. The dye sublimation method of claim 12, further comprising:

dynamically adjusting, the pressure applied by the vacuum pump to a pressure that corresponds to a desired depth for the applied pattern.

14. The dye sublimation method of claim 11, further comprising:

providing a temperature sensor to measure a temperature of at least one of the substrate, the printed sheet, or the texture sheet; and dynamically adjusting, while heating the printed sheet, the pressure applied by the membrane via a controller, wherein the controller is configured to dynamically adjust the pressure based on the temperature of the at least one of the substrate, the printed sheet, or the texture provided by the temperature sensor.

15. The dye sublimation method of claim 11, wherein the texture sheet is a first texture sheet and the pattern is a first pattern, the dye sublimation method further comprising:

providing a second texture sheet between the substrate and the bed, the second texture sheet having a second pattern;

applying, via the membrane over the printed sheet, the substrate, the first texture sheet, and the second texture sheet, a pressure to the printed sheet, the substrate, the first texture sheet, and the second texture sheet;

wherein the second texture sheet is configured to apply the second pattern to the substrate.

16. The dye sublimation method of claim 11, wherein the printed sheet is a first printed sheet and the image is a first image, the dye sublimation method further comprising:

providing a second printed sheet between the substrate and the bed, the second printed sheet having a second image;

applying, via the membrane over the first printed sheet, the substrate, the texture sheet, and the second printed sheet, a pressure to the first printed sheet, the substrate, the texture sheet, and the second printed sheet;

heating, by the heat section of the dye sublimation apparatus, the second printed sheet to sublimate one or more dyes forming the second image, such that the one or more dyes travel into the substrate in a gaseous state and deposit into the substrate in a solid state to infuse the second image into the substrate; and dynamically adjusting, while heating the second printed sheet, the pressure applied by the membrane.

17. The dye sublimation method of claim 11, wherein the membrane is a first membrane, the dye sublimation method further comprising:

providing a second membrane between the substrate and the bed;

applying, via the first membrane over the printed sheet, the substrate, and the texture sheet and via the second membrane under the printed sheet, the substrate, and the texture sheet, a pressure to the texture sheet, the printed sheet, and the substrate.

18. The dye sublimation method of claim 17, further comprising:

forming, via the first membrane and the second membrane an enclosed space containing the texture sheet, the printed sheet, and the substrate;

coupling, to a vacuum pump, the enclosed space; and applying, via the vacuum pump, an additional pressure to the printed sheet, the substrate, and the texture sheet.

19. A dye sublimation apparatus for infusing images on printed sheets to a substrate, the dye sublimation apparatus comprising:

a bed comprising a first heated plate and configured to receive a first printed sheet, the substrate, a second printed sheet, and a textured sheet, the first printed sheet and the second printed sheet positioned on opposite sides of the substrate and comprising one or more images and the textured sheet comprising a pattern;

a membrane configured to cover the first printed sheet, the substrate, the second printed sheet, and the texture sheet, wherein the membrane is coupled to a vacuum pump, the vacuum pump configured to control a pressure applied by the membrane to the printed sheet, substrate, and texture sheet;

a controller configured to transmit control signals to the vacuum pump to dynamically adjust the pressure applied by the membrane; and a second heated plate, the first heated plate and the second heated plate positioned on opposing sides of the first printed sheet, the substrate, the second printed sheet, and the texture sheet, wherein the first heated plate and the second heated plate are configured to heat the first printed sheet and the second printed sheet to sublimate one or more dyes forming the one or more images, such that the one or more dyes travel into the substrate in a gaseous state and deposit into the substrate in a solid state to infuse the one or more images into the substrate, the texture sheet configured to apply the pattern to the substrate.

20. The dye sublimation apparatus of claim 19, wherein the first heated plate and the second heated plate are movable between a receiving position to receive the first printed sheet, the substrate, the second printed sheet, and the texture sheet, and an operating position to apply pressure to the first printed sheet, the substrate, the second printed sheet, and the texture sheet.

* * * * *